US011490283B2

(12) United States Patent
Yang et al.

(10) Patent No.: US 11,490,283 B2
(45) Date of Patent: Nov. 1, 2022

(54) L1-SINR MEASUREMENT PERIOD BASED ON CHANNEL MEASUREMENT RESOURCE (CMR) AND INTERFERENCE MEASUREMENT RESOURCE (IMR)

(71) Applicant: MediaTek Inc., Hsinchu (TW)

(72) Inventors: Chih-Kai Yang, Hsinchu (TW); Hsuan-Li Lin, Hsinchu (TW); Tsang-Wei Yu, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 29 days.

(21) Appl. No.: 17/216,077

(22) Filed: Mar. 29, 2021

(65) Prior Publication Data

US 2021/0321279 A1 Oct. 14, 2021

Related U.S. Application Data

(60) Provisional application No. 63/007,981, filed on Apr. 10, 2020.

(51) Int. Cl.
*H04W 24/10* (2009.01)
*H04B 17/336* (2015.01)
(Continued)

(52) U.S. Cl.
CPC .......... *H04W 24/10* (2013.01); *H04B 7/0617* (2013.01); *H04B 7/0626* (2013.01);
(Continued)

(58) Field of Classification Search
CPC .. H04B 7/0613; H04B 7/0617; H04B 7/0626; H04B 17/336; H04L 5/0048;
(Continued)

(56) References Cited

U.S. PATENT DOCUMENTS

| 10,945,149 B1* | 3/2021 | Ryu | H04B 17/345 |
| 2009/0052512 A1* | 2/2009 | Kim | H04B 7/01 |
| | | | 375/227 |
| 2021/0235298 A1* | 7/2021 | Venugopal | H04W 24/10 |

OTHER PUBLICATIONS

Requirements for support of radio resource management, Feb. 2020, 3GPP TS 38.133 version 15.8.0 Release 15, pp. 1-1106 (Year: 2020).*

(Continued)

*Primary Examiner* — Michael Thier
*Assistant Examiner* — Prince A Mensah
(74) *Attorney, Agent, or Firm* — Tong J. Lee (57) ABSTRACT

A user equipment terminal (UE) in a wireless network calculates a measurement period for measuring the signal-to-interference-plus-noise ratio (SINR) for a serving cell within a frequency range. The calculation is based on a channel measurement resource (CMR) and an interference measurement resource (IMR). The calculation includes evaluation of a sharing factor P, which is a maximum of $P_{CMR}$ of the CMR and $P_{IMR}$ of the IMR. The $P_{CMR}$ and the $P_{IMR}$ are evaluated, at least in part, based on periodicity of the CMR and the IMR in relation to other periodic measurements performed by the UE. The UE performs a channel measurement and an interference measurement using the CMR and the IMR, respectively, over the measurement period. The UE calculates the SINR based on the channel measurement and the interference measurement; and transmits an SINR measurement report indicating the calculated SINR to a base station.

20 Claims, 6 Drawing Sheets

(51) Int. Cl.
   *H04B 7/06*   (2006.01)
   *H04L 5/00*   (2006.01)
   *H04W 56/00*  (2009.01)

(52) U.S. Cl.
   CPC ......... *H04B 17/336* (2015.01); *H04L 5/0051* (2013.01); *H04W 56/001* (2013.01)

(58) Field of Classification Search
   CPC ................ H04L 5/005; H04L 5/0051; H04W 24/00–10; H04W 56/001
   See application file for complete search history.

(56) References Cited

OTHER PUBLICATIONS

3GPP Technical Specification 138.133, V15.8.0, clause 9.5.4.1 and clause 9.5.4.2, Feb. 2020.

\* cited by examiner

L1-SINR MEASUREMENT PERIOD BASED ON CHANNEL MEASUREMENT RESOURCE (CMR) AND INTERFERENCE MEASUREMENT RESOURCE (IMR)

CROSS-REFERENCE TO RELATED APPLICATIONS

This application claims the benefit of U.S. Provisional Application No. 63/007,981 filed Apr. 10, 2020, the entirety of which is incorporated by reference herein.

TECHNICAL FIELD

Embodiments of the invention relate to wireless communications; more specifically, to the measurement period of the signal-to-noise-plus-interference ratio (SNIR).

BACKGROUND

The Fifth Generation New Radio (5G NR) is a telecommunication standard for mobile broadband communications. NR is promulgated by the 3rd Generation Partnership Project (3GPP) to significantly improve performance metrics such as latency, reliability, throughput, etc. Furthermore, NR supports beamforming, multiple-input multiple-output (MIMO) antenna technology, and carrier aggregation.

In a 5G NR network, a base station can transmit one or more reference signals to a UE, such as channel state information reference signal (CSI-RS) and synchronous signal block (SSB). From these reference signals, the UE can measure the channel quality of the downlink transmission. One indicator of downlink channel quality is the reference signal received power (RSRP); another indicator of downlink channel quality is the signal-to-interference-plus-noise ratio (SINR). The UE reports the measured indicator to the base station, and the base station adjusts downlink signals based on the report from the UE. For example, the base station can adjust the downlink data rate and modulation scheme based on the UE's report.

The existing 5G NR technology can be further improved to benefit operators and users. These improvements may also apply to other multi-access technologies and the telecommunication standards that employ these technologies.

SUMMARY

In one embodiment, a method is performed by a UE in a wireless network. The method comprises calculating a measurement period for measuring SINR for a serving cell within a frequency range based on a channel measurement resource (CMR) and an interference measurement resource (IMR). The calculating includes evaluation of a sharing factor P, which is a maximum of $P_{CMR}$ of the CMR and $P_{IMR}$ of the IMR. The $P_{CMR}$ and the $P_{IMR}$ are evaluated, at least in part, based on periodicity of the CMR and the IMR in relation to other periodic measurements performed by the UE. The method further comprises: performing a channel measurement and an interference measurement using the CMR and the IMR, respectively, over the measurement period; calculating the SINR based on the channel measurement and the interference measurement; and transmitting an SINR measurement report indicating the calculated SINR to a base station.

In another embodiment, an apparatus for wireless communication is provided. The apparatus may be a UE in a wireless network. The apparatus comprises: a memory to store configurations of at least a channel measurement resource (CMR) and an interference measurement resource (IMR); transceiver circuitry operative to transmit an SINR measurement report indicating calculated SINR to a base station; and processing circuitry coupled to the memory. The processing circuitry is operative to calculate a measurement period for measuring SINR for a serving cell within a frequency range based on a CMR and an IMR. The calculating includes evaluation of a sharing factor P, which is a maximum of $P_{CMR}$ of the CMR and $P_{IMR}$ of the IMR. The $P_{CMR}$ and the $P_{IMR}$ are evaluated, at least in part, based on periodicity of the CMR and the IMR in relation to other periodic measurements performed by the UE. The processing circuitry is further operative to perform a channel measurement and an interference measurement using the CMR and the IMR, respectively, over the measurement period; and calculate the SINR based on the channel measurement and the interference measurement.

Other aspects and features will become apparent to those ordinarily skilled in the art upon review of the following description of specific embodiments in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention apply to the L1-SINR measurements performed by a UE. More specifically, methods for determining the L1-SINR measurement period (i.e., the time length for performing an L1-SINR measurement) are provided. A UE may be configured by the network with at least one channel measurement resource (CMR) and at least one interference measurement resource (IMR) for computing the L1-SINR. The CMR may be a synchronization signal block (SSB) based or CSI-RS based (e.g., NZP CSI-RS). The IMR may be NZP-IMR (e.g., NZP CSI-RS) or ZP-IMR (e.g., CSI-IM). The UE may be configured with a CMR set including multiple CMRs and an IMR set including multiple IMRs. The CMRs and the IMRs are 1-to-1 mapped to each other. In one embodiment, a base station may configure time and frequency resources for each CMR and IMR, and transmit the configurations to the UE via higher layer signaling; e.g., via the medium access control (MAC) control element (CE), or the radio resource control (RRC) signaling. A CMR and the corresponding IMR have the same periodicity and time-domain behavior, e.g. periodic, semi-persistent, or aperiodic.

The UE uses a CMR and a corresponding IMR to perform channel measurement and interference measurement, respectively. After the measurements, the UE calculates the SINR and reports the SINR to the base station. The UE may be required to perform the channel and interference measurements within an SINR measurement period. The measurement period is determined based on the periodicity of SINR reporting ($T_{Report}$), discontinuous reception ($T_{DRX}$), the CMR ($T_{CMR}$), and a number of factors extending the measurement period, such as the N factor (the beamforming scaling factor), and the P factor (the sharing factor). In the following, the evaluations of the N factor and the P factor under a number of different scenarios are disclosed.

The disclosed method, as well as the apparatus and the computer product implementing the method, can be applied to wireless communication between a base station (e.g., a gNB in a 5G NR network) and UEs. It is noted that while the embodiments may be described herein using terminology commonly associated with 5G or NR wireless technologies, the present disclosure can be applied to other multi-access technologies and the telecommunication standards that employ these technologies.

Figure 1:
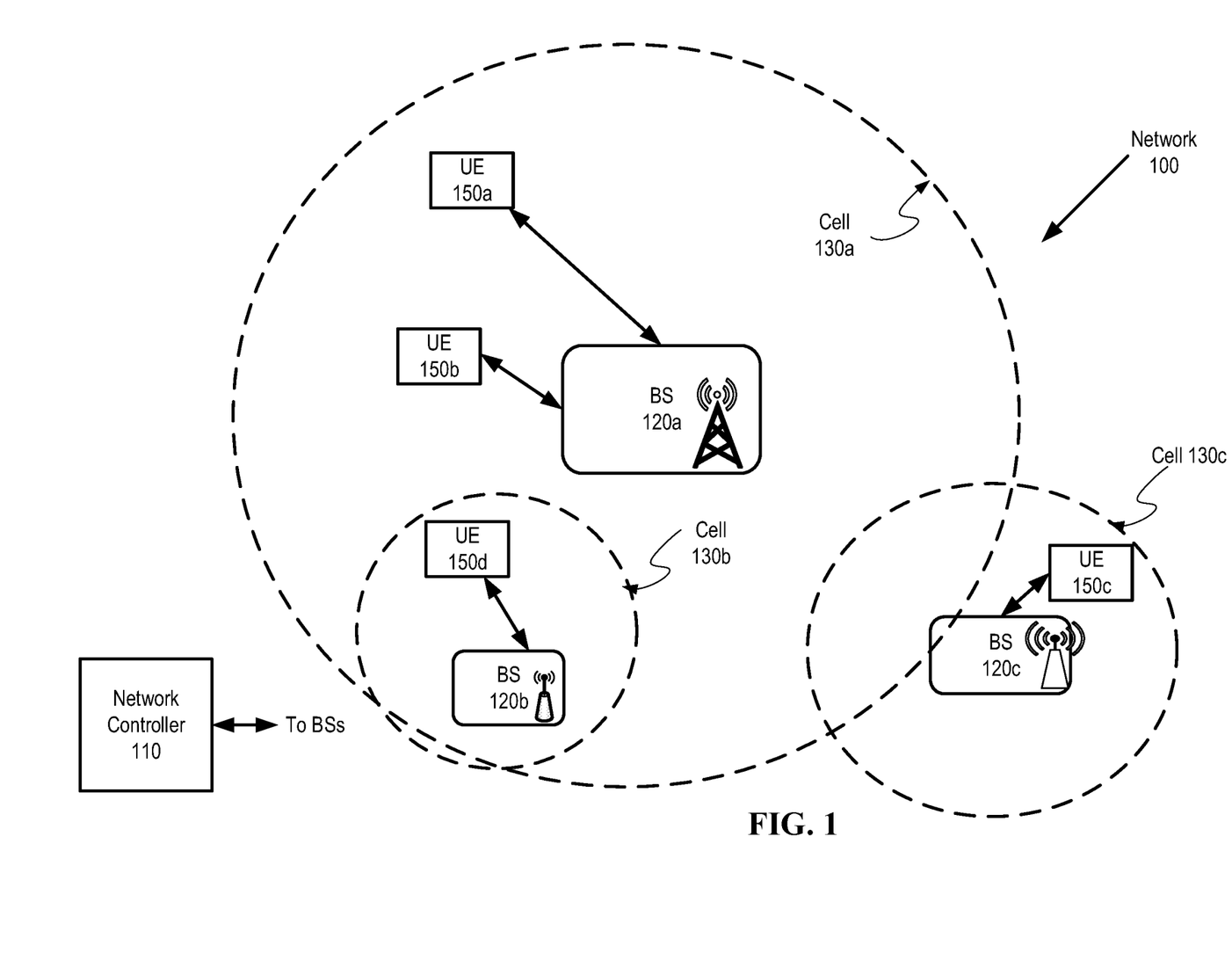
FIG. 1 is a diagram illustrating a network in which a base station and a UE communicate according to one embodiment.

FIG. 1 is a diagram illustrating a network 100 in which embodiments of the present invention may be practiced. The network 100 is a wireless network which may be a 5G NR network. To simplify the discussion, the methods and apparatuses are described within the context of a 5G NR network. However, one of ordinary skill in the art would understand that the methods and apparatuses described herein may be applicable to a variety of other multi-access technologies and the telecommunication standards that employ these technologies.

The number and arrangement of components shown in FIG. 1 are provided as an example. In practice, the network 100 may include additional devices, fewer devices, different devices, or differently arranged devices than those shown in FIG. 1.

Referring to FIG. 1, the network 100 may include a number of base stations (shown as BSs), such as base stations 120a, 120b, and 120c, collectively referred to as the base stations 120. In some network environments such as a 5G NR network, a base station may be known as a gNodeB, a gNB, and/or the like. In an alternative network environment, a base station may be known by other names. Each base station 120 provides communication coverage for a particular geographic area known as a cell, such as a cell 130a, 130b, or 130c, collectively referred to as cells 130. The radius of a cell size may range from several kilometers to a few meters. A base station may communicate with one or more other base stations or network entities directly or indirectly via a wireless or wireline backhaul.

A network controller 110 may be coupled to a set of base stations such as the base stations 120 to coordinate, configure, and control these base stations 120. The network controller 110 may communicate with the base stations 120 via a backhaul.

The network 100 further includes a number of UEs, such as UEs 150a, 150b, 150c, and 150d, collectively referred to as the UEs 150. The UEs 150 may be anywhere in the network 100, and each UE 150 may be stationary or mobile. The UEs 150 may also be known by other names, such as a mobile station, a subscriber unit, and/or the like. Some of the UEs 150 may be implemented as part of a vehicle.

Examples of the UE 150 may include a cellular phone (e.g., a smartphone), a wireless communication device, a handheld device, a laptop computer, a tablet, a gaming device, a wearable device, an entertainment device, a sensor, an infotainment device, Internet-of-Things (IoT) devices, or any device that can communicate via a wireless medium. The UE 150 can be configured to receive and transmit signals over an air interface to one or more cells in a radio access network.

In one embodiment, the UEs 150 may communicate with their respective base stations 120 in their respective cells 130. A UE may have more than one serving cell; e.g., UE 150d may have both cell 130b and cell 130a as its serving cells. The transmission from a UE to a base station is called uplink transmission, and from a base station to a UE is called downlink transmission.

In one embodiment, the UE 150 provides layer-3 (L3) functionalities through a radio resource control (RRC) layer, which is associated with the transfer of system information, connection control, and measurement configurations. The UE 150 further provides layer-2 (L2) functionalities through a packet data convergence protocol (PDCP) layer, a radio link control (RLC) layer, and a medium access control (MAC) layer. The PDCP layer is associated with header compression/decompression, security, and handover support. The RLC layer is associated with the transfer of packet data units (PDUs), error correction through automatic repeat request (ARQ), concatenation, segmentation, and reassembly of RLC service data units (SDUs). The MAC layer is associated with the mapping between logical channels and transport channels, multiplexing of MAC SDUs onto transport blocks (TBs), de-multiplexing of MAC SDUs from TBs, scheduling information reporting, error correction through hybrid ARQ (HARQ), priority handling, and logical channel prioritization. The UE 150 further provides layer-1 (L1) functionalities through a physical (PHY) layer, which is associated with error detection on the transport channels, forward error correction (FEC) coding/decoding of the transport channels, interleaving, rate matching, mapping onto physical channels, modulation/demodulation of physical channels, and multiple-input and multiple-output (MIMO) antenna processing, etc.

In a 5G NR network, a base station such as a gNB may configure and activate a bandwidth part (BWP) for communication with UEs in a serving cell, through an RRC configuration according to an RRC layer protocol. The activated BWP is a frequency resource that can be subdivided into multiple frequency resources of smaller bandwidths. The time scheduled for the communication is referred to as the time resources. The frequency resources and the time resources are herein collectively referred to as the time-and-frequency resources. In a wireless network, different serving cells may be configured with different time-and-frequency resources. Different time-and-frequency resources may be allocated to different physical uplink channels, physical downlink channels, uplink signals, and downlink signals.

Multiple time and frequency configurations are supported by NR, With respect to time resources, a frame may be 10 milliseconds (ms) length, and may be divided into ten subframes of 1 ms each. Each subframe may be further divided into multiple equal-length time slots (also referred to as slots), and the number of slots per subframe may be different in different configurations, Each slot may be further divided into multiple equal-length symbol durations (also referred to as symbols); e.g., 7 or 1.4 symbols, With respect to frequency resources, NR supports multiple different sub-carrier bandwidths. Contiguous subcarriers (also referred to as resource elements (REs)) are grouped into one resource block (RB). In one configuration, one RB may contain 12 subcarriers.

In one embodiment, a base station such as a gNB may configure a set of time-and-frequency resources as a CMR set and another set of time-and-frequency resources as an IMR set for a UE. The UE uses the CMR and the IMR set to perform SINR measurements for a serving cell within an activated MVP. The configurations may be stored in the UE.

Figure 2:
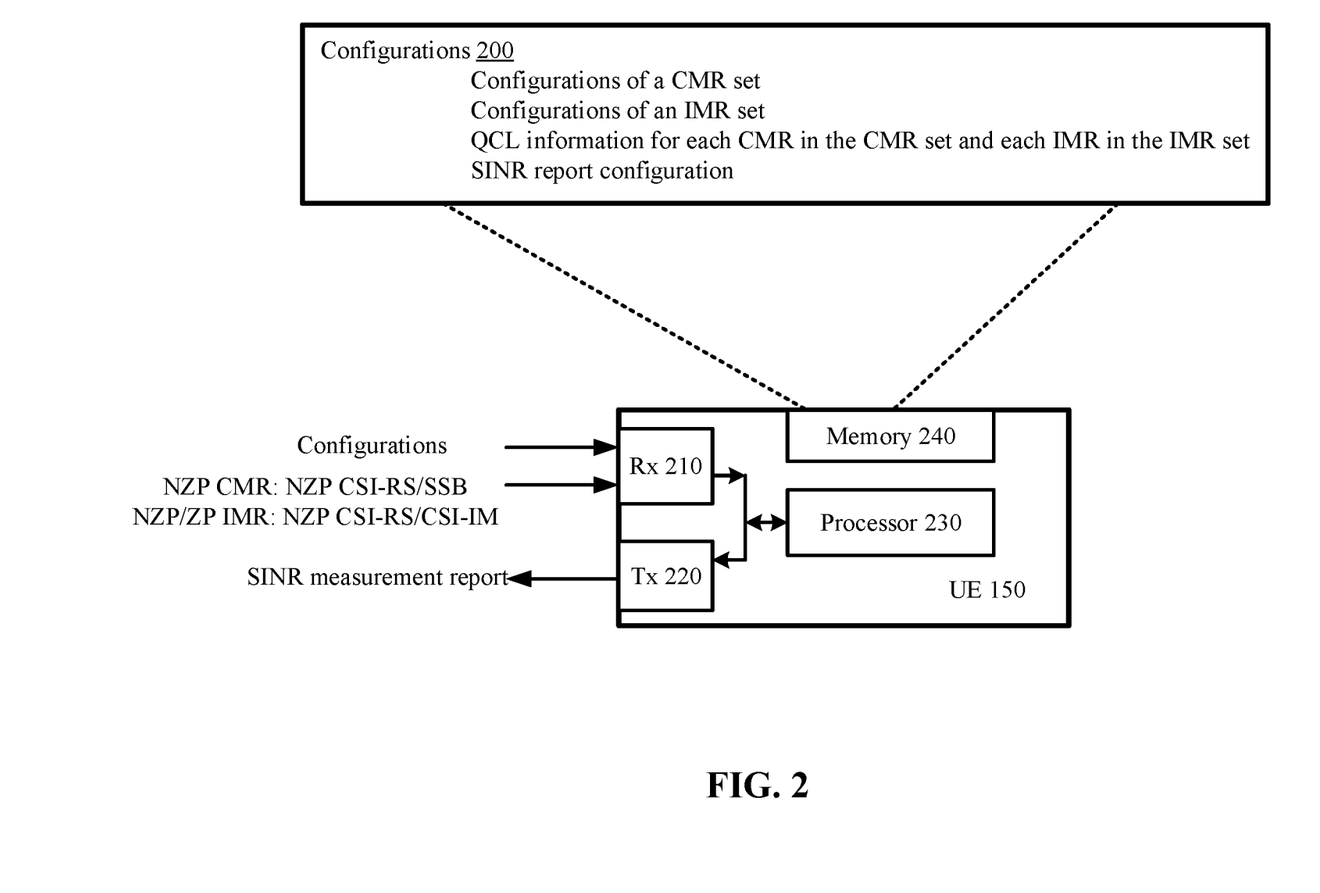
FIG. 2 is a diagram illustrating configurations of a UE for performing SINR measurements according to one embodiment.

FIG. 2 is a diagram illustrating an example of configurations 200 for SINR measurements and reporting according to one embodiment. The configurations 200 contain configurations for a CMR set and an IMR set for measuring SINR for a serving cell within an activated BWP. The CMR set is a set of time-and-frequency resources scheduled for one or amore CMRs. The IMR set is a set of time-and-frequency resources scheduled for one or more IMRs. The CMRs and the IMRs are 1-to-1 mapped; that is, each CMR has a corresponding IMR for the purpose of SINR measurements, A downlink reference signal such as NZP CSI-RS or SSB may be configured as a CMR. Another downlink signal such as NZP CSI-RS may be configured as NZP-IMR, or CS-IM may be configured a ZP-IMR.

Additionally, the configurations 200 include or indicate quasi-collocation (QCL) information for each CSI-RS resource configured as a CMR in the CMR set or an IMR in the IMR set. The QCL information indicates to the UE 150 regarding which Rx beam to be used for receiving the CMR and the IMR, thereby enabling the UE 150 to perform L1-SINR measurements. The following disclosure regarding the QCL information describes CMRs for simplicity; however, it is understood that the QCL information is also provided to all IMRs in the IMR set.

For periodic CSI-RS, the QCL information may be provided in a qcl-InfoPeriodicCSI-RS configuration; for semi-persistent CSI-RS, the QCL, information may be indicated as a TCI state in a CSI-RS configuration. This TCI state is provided for all CMRs n the CMR set in the MAC CE activating the CMR set. The QCL information for a CMR with high layer parameter "repetition" set to OFF includes a farther indication regarding which Rx beam to be used. An example of this further indication is the QCL-TypeD (spatial Rx parameter) relation with another reference signal; e.g., an SSB for L1-RSRP or L1-SINR measurement, or another CSI-RS in the CMR set configured with repetition set to ON. The "repetition" a high layer parameter indicating whether the same CSI-RS is repeatedly transmitted a number of times from the base station via the same Tx beam. Further details about the "repetition" will be provided later in connection with FIG. 3.

The configurations 200 further include an SINR report configuration, which, among other things, specifies whether the SINR reporting is periodic, semi-persistent, or aperiodic. The SINR report configuration may further specify the periodicity of SINR reporting ($T_{Report}$).

The UE 150 may receive the configurations 200 via a radio receiver (Rx) 210 and store the configurations 200 in a memory 240. The UE 150 determines a measurement period for measuring the SINR. This measurement period is the time window within which the UE 150 measures a CMR and a corresponding IMR. The UE 150 receives and to the reference signals configured aa a CMR and the corresponding IMR over the measurement period. The UE 150 includes a processor 230 to compute the SINR. The UE 150 sends an SINR report to the base station via a radio transmitter (Tx) 220 according to the SINR report configuration. The measurement period is determined based on a number of factors. For a frequency range in FR1 (e.g., 4.1 GHz to 7.125 GHz), the factors include at least a sharing factor P. For a frequency range in FR2 (e.g., 24.25 GHz to 52.6 GHz), the factors include at least a sharing factor P and a beamforming scaling factor N. The P and N factors for calculating L1-RSRP are defined in the 3GPP Technical Specification (TS) 138.133 V15.8.0, 2020-02, clause 9.5.4.1 and clause 9.5.4.2. However, TS 138.133 V15.8.0 does not disclose the use of P and N factors for determining the L1-SiNR measurement period.

Figure 3:
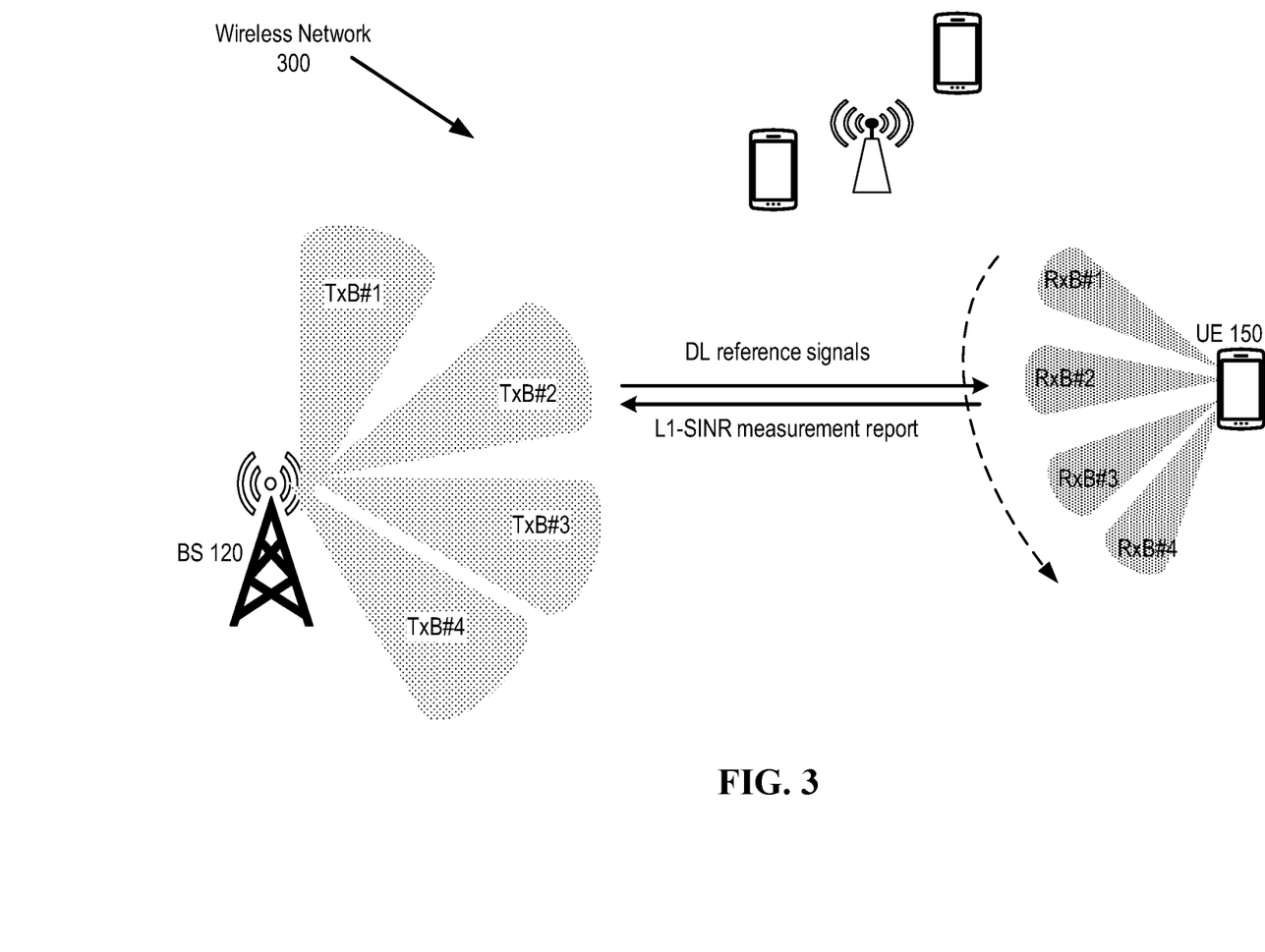
FIG. 3 is a diagram illustrating beamforming communications between a UE and a base station according to one embodiment.

FIG. 3 is a diagram illustrating a wireless network 300 in which the BS 120 and the UE 150 communicating with each other via beamformed signals according to one embodiment. In one embodiment, both the BS 120 and the UE 150 include MIMO antenna arrays for performing beam steering and tracking in transmit (Tx) and receive (Rx) directions. In the example of FIG. 3, the BS 120 forms Tx beams TxB #1, TxB #2, TxB #3, and TxB #4 for downlink transmission, and the UE 150 forms Rx beams RxB #1, RxB #2, RxB #3, and RxB #4 for downlink reception. In one embodiment, the Tx beams of the BS 120 and the Rx beams of the UE 150 may also be used for uplink communications. In an alternative embodiment, the BS 120 and/or the UE 150 may form a different number of beams than what is shown in FIG. 3. Each beam corresponds to a spatial relation between the BS 120 and the UE 150. To the UE 150, a spatial relation is equivalent to spatial filtering that the UE 150 can apply in the analog and/or digital domain.

Physical signals, including data signals, control signals, and reference signals, are transmitted in both the uplink and downlink directions. Uplink reference signals may include demodulation reference signal (DMRS), phase tracking reference signal (PTRS), sounding reference signal (SRS), among others, and downlink reference signals may include DMRS, PTRS, CSI-RS, SSB, among others.

The BS 120 may transmit downlink reference signals to the UE 150 or a group of UEs in a serving cell. The BS 120 may perform a beam sweep operation, which changes the transmit directions for the Tx beams in a sweep cycle. In one embodiment, the BS 120 transmits an SSB burst containing multiple SSBs, each of which may be transmitted in a different Tx beam in a downlink beam sweep cycle. The UE 150 listens for the SSB in different directions and receives the SSB in an SSB burst with the strongest signal strength. When an SSB is configured as a CMR in the CMR set, the SINR measurement time (also referred to as the SINR measurement period) is extended to accommodate the SSB tracking and reception. In one embodiment, for an SSB configured as a CMR in the CMR set in FR2, the SINR measurement period may be extended by an N factor=8.

When an NZP CSI-RS is configured as a CMR with the higher layer parameter repetition ON, the BS 120 repeatedly transmits the same CSI-RS via the same Tx beam several times, during which the UE can train its Rx beams and identify the best Rx beam to receive the CSI-RS. For example, the UE 150 may perform an Rx beam sweep operation to identify the best Rx beam for receiving the CSI-RS during the repeated transmissions. This Rx beam training may extend the SINR measurement period by an N factor. More specifically, the N factor indicates the time extension for measuring an NZP CSI-RS configured as CMR in the FR2 frequency range.

When repetition is OFF; i.e., no Rx beam training is performed, N is equal to 1. That is, the UE relies on another reference signal with which the NZP CSI-RS (configure as a CMR) has a QCL-Type D relation. This other reference signal may be an SSB or another CSI-RS in the resource set (e.g., the CMR set) with repetition ON.

When repetition is ON; i.e., Rx beam training is performed, N is equal to ceil(maxNumberRxBeam/Nres_per_set), where Nres_per_set is the number of resources in the resource set configured for the UE (e.g., the number of CMRs in the CMR set). For example, when two NZP CSI-RS (e.g., Nres_per_set=2) are configured as CMRs in the UE's CMR set with repetition ON, the BS 120 can repeatedly and concurrently transmit the two NZP CSI-RS, and the UE 150 can turn on (i.e., train) two Rx beams at the same time. Training multiple Rx beams at the same time can reduce the CMR measurement time (e.g., by a factor of Nres_per_set) and, therefore, reduce the amount of time extension for the SINR measurement period.

The N factor, referred to as the Rx beamforming scaling factor, is evaluated based on the CMR configurations, and not based on the IMR configurations. That is, the N factor for a CSI-RS based CMR (e.g., NZP CSI-RS) can be evaluated based on whether the NZP CSI-RS is periodic, semi-persistent, or aperiodic, whether the parameter repetition is ON or OFF, and whether the QCL information is configured for the NZP CSI-RS. The N factor for an SSB based CMR is a constant number 8. The N factor does not apply to CMR in the FR1 frequency range. Additional parameters needed for calculating N may include maxNumberRxBeam and Nres_per_set, neither of which is obtained from or related to the IMR configurations.

More specifically, for periodic or semi-persistent CSI-RS resources as CMRs in a resource set configured with repetition OFF, N=1. This N value applies if qcL-InfoPeriodicCSI-RS is configured for all CMRs in the CMR set and each CMR has QCL-TypeD with (i) an SSB for L1-RSRP or L1-SINR measurement, or (ii) another CSI-RS in resource set configured with repetition ON. For periodic or semi-persistent CSI-RS resources as CMRs in a resource set configured with repetition ON, N=ceil(maxNumberRxBeam/Nres_per_set), where Nres_per_set is the number of resources in the resource set (e.g., the number of CSI-RS configured as CMRs in the CMR set). This N value applies if qcl-InfoPeriodicCSI-RS is configured for all CMRs in the CMR set.

For aperiodic CSI-RS resources configured as CMRs in a CMR set with repetition OFF, N=1. This N value applies if qcl-info is configured for all resources in the resource set and for each resource has QCL-TypeD with (i) SSB for L1-RSRP or L1-SINR measurement, or (ii) another CSI-RS in resource set configured with repetition ON. For aperiodic CSI-RS resources configured as CMRs in a CMR set with repetition ON, N=1. The N value applies if qcl-info is configured for all CMRs in the CMR set.

Figure 4:
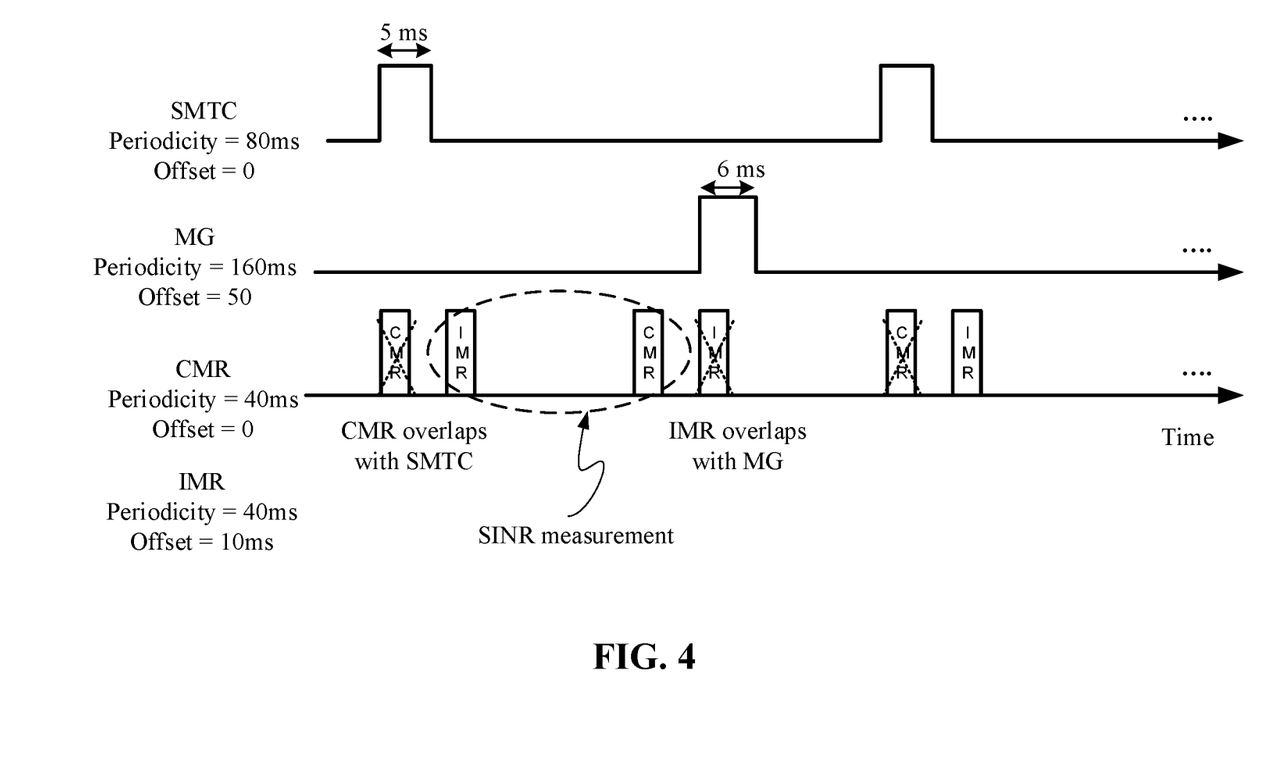
FIG. 4 is a diagram illustrating overlapped measurement periods according to one embodiment.

FIG. 4 illustrates an example for relaxing (i.e., extending) the SINR measurement period due to partial or full overlaps with other UE measurements according to one embodiment. These other measurements may be performed during a measurement gap (MG) or during an SSB-based measurement timing configuration (SMTC) window. The SINR measurement period is extended because the UE does not perform measurements in a frequency channel while receiving or transmitting signals in that same frequency channel. An MG is a time period in which neither uplink nor downlink transmission is scheduled. A UE may use the MG to perform intra-frequency, inter-frequency and/or inter-RAT (radio access technology) measurements. Measurement gap repetition period (MGRP) is the periodicity of measurement gaps. An SMTC window is the time window in which the UE receives and measures SSB bursts; e.g., for timing synchronization or other purposes. The UE performs no SINR measurements during an MG or an SMTC window. If the collision or overlapping between the configurations for CMR, IMR, SMTC, or MG occurs, UE may not be able to simultaneously perform the corresponding measurement procedures. The P factor extends the SINR measurement period; during the extended measurement period, the UE may measure the CMR and the IMR that are not overlapping with an SMTC window and not overlapping with a MG.

In one embodiment, the SINR measurement period is relaxed (i.e., extended) by a P factor to allow the UE to perform the L1-SINR measurement with a longer evaluation period. This P factor is also referred to as the sharing factor P. For SINR measurement, P is defined as the maximum value between $P_{CMR}$ and $P_{IMR}$, i.e., $P=\max(P_{CMR}, P_{IMR})$, where $P_{CMR}$ is the P factor for CMR, and $P_{IMR}$ is the P factor for the corresponding IMR. $P_{CMR}$ and $P_{IMR}$ are evaluated independently of each other using the P factor evaluation formulations for L1-RSRP.

The P factor for the L1-SINR measurement period takes into account two resources (i.e., CMR and IMR); therefore, it is different from the P factor for L1-RSRP which only considers one resource. The values of $P_{CMR}$ and $P_{IMR}$ may be different, i.e., the measurement time for the CMR and the IMR may also be different, as shown in the example of FIG. 4. The P factor for L1-SINR applies to CMRs and IMRs in FR1 as well as CMRs and IMRs in FR2.

The example in FIG. 4 illustrates an example of P factor calculations performed by the UE according to one embodiment. It is noted that the various time durations in FIG. 4 are not drawn to scale. In the example, the CMR and the IMR are configured in FR2. The CMR is SSB based, and the corresponding IMR is CSI-RS based; i.e., an SSB is configured as the CMR and a CSI-RS is configured as the corresponding IMR. For the periodicity (i.e., cycle period) configurations, $T_{SMTCperiod}$=80 ms, MGRP=160 ms, $T_{CMR}$=40 ms, and $T_{IMR}$=40 ms. For the offset configuration, SMTC=0 ms, MGRP=50 ms, CMR=0 ms and IMR=10 ms. The SMTC is not overlapped with MG; i.e., the SMTC occasions are not overlapped with MG occasions.

$P_{CMR}$ and $P_{IMR}$ can be determined individually as follows. The SSB based CMR is partially overlapped with SMTC ($T_{CMR}<T_{SMTCperiod}$) and not overlapped with MG; thus, $P_{CMR}=(1-T_{CMR}/T_{SMTCperiod})^{-1}=(1-\frac{1}{2})=2$. The CSI-RS based IMR is partially overlapped with MG ($T_{CMR}<$MGRP) and not overlapped with SMTC; thus, $P_{IMR}=(1-T_{IMR}/MGRP)^{-1}=(1-\frac{1}{4})=1.33$. The P factor for computing the SINR based on the CMR and the IMR is $P=\max(P_{CMR},$ $P_{IMR}$)=max (2, 1.33)=2. Therefore, the measurement period for L1-SINR is extended two times, during which one available L1-SINR measurement can be obtained.

The above example illustrates one scenario for calculating the P factor. In general, for an SSB based CMR, $P_{CMR}$ is calculated in the same way as the P factor for SSB based L1-RSRP measurement as defined in TS 138.133 V15.8.0, 2020-02, clause 9.5.4.1; the entire clause is incorporated herein by reference. For an NZP CSI-RS configured as CMR, $P_{CMR}$ is calculated in the same way as the P factor for CSI-RS based L1-RSRP measurement as defined in TS 138.133 V15.8.0, 2020-02, clause 9.5.4.2; the entire clause is incorporated herein by reference. Similarly, for an NZP CSI-RS configured as NZP-IMR or a CSI-IM configured as ZP-IMR, $P_{IMR}$ is calculated in the same way as the P factor for CSI-RS based L1-RSRP measurement as defined in TS 138.133 V15.8.0, 2020-02, clause 9.5.4.2; the entire clause is incorporated herein by reference. The L1-RSRP measurement period takes into account only one reference signal resource. By contrast, the L1-SINR measurement period takes into account two reference signal resources, i.e., CMR and IMR. The P factor for the L1-SINR measurement period takes into account both CMR and IMR by individually computing $P_{CMR}$ and $P_{IMR}$ and taking the maximum of the two.

The SINR measurement period is the time duration in which the UE obtains at least one channel measurement from CMR and at least one interference measurement from IMR. In addition to the aforementioned N factor and the P factor, the SINR measurement period also takes into account an M factor, $T_{DRX}$ (the DRX cycle length), and $T_{Report}$ (the configured periodicity for SINR reporting). For CSI-RS based CMR, the SINR measurement period takes into account $T_{CSI-RS}$ (the periodicity of NZP CSI-RS configured as CMR, which is the same as the periodicity of the corresponding IMR). For SSB based CMR, the SINR measurement period takes into account $T_{SSB}$ (the periodicity of SSB configured as CMR, which is the same as the periodicity of the corresponding IMR).

With respect to the M factor, in a scenario of a CSI-RS based CMR, M=1 for aperiodic NZP-CSI-RS as CMR or dedicated IMR, or aperiodic CSI-IMR as dedicated IMR, or periodic and semi-persistent NZP-CSI-RS as CMR or dedicated IMR and higher layer parameters timeRestrictionForChannelMeasurement or timeRestrictionForInterferenceMeasurements are configured, or periodic and semi-persistent CSI-IM as dedicated IMR and higher layer parameters timeRestrictionForChannelMeasurement or timeRestrictionForInterferenceMeasurements are configured. Otherwise, M=3.

In a scenario of an SSB based CMR, M=1 for periodic or semi-persistent NZP CSI-RS or CSI-IM resource as dedicated IMR, if higher layer parameter timeRestrictionForChannelMeasurements or timeRestrictionForInterferenceMeasurements is configured, and M=3 otherwise. Moreover, M=1 for aperiodic NZP-CSI-RS or CSI-IM resource as dedicated IMR, and M=3 otherwise.

Discontinuous Reception (DRX) can be activated to conserve UE power. With the DRX activated, a UE monitors the downlink channel in the "DRX ON" duration, and enters a sleep state (e.g., by switching off most of its circuitry) when DRX is not on. The DRX ON duration is periodic, and $T_{DRX}$ is the cycle length of DRX ON.

For non-DRX configuration, the SINR measurement period for an SSB based CMR in FR1 is max($T_{Report}$, ceil(M·P)·$T_{SSB}$). When $T_{DRX}$<320 ms, the SINR measurement period is max($T_{Report}$, ceil(1.5·M·P)·max($T_{DRX}$, $T_{SSB}$)). When $T_{DRX}$>320 ms, the SINR measurement period is ceil(M·P)·$T_{DRX}$.

For non-DRX configuration, the SINR measurement period for an SSB based CMR in FR2 is max($T_{Report}$, ceil(M·P·N)·$T_{SSB}$). When $T_{DRX}$≤320 ms, the SINR measurement period is max($T_{Report}$, ceil(1.5·M·P·N)·max($T_{DRX}$, $T_{SSB}$)). When $T_{DRX}$>320 ms, the SINR measurement period is ceil(1.5·M·P·N)·$T_{DRX}$.

For non-DRX configuration, the SINR measurement period for a CSI-RS based CMR in FR1 is max($T_{Report}$, ceil(M·P)·$T_{CSI-RS}$). When $T_{DRX}$≤320 ms, the SINR measurement period is max($T_{Report}$, ceil(1.5·M·P)·max($T_{DRX}$, $T_{CSI-RS}$)). When $T_{DRX}$>320 ms, the SINR measurement period is ceil(M·P)·$T_{DRX}$.

For non-DRX configuration, the SINR measurement period for a CSI-RS based CMR in FR2 is max($T_{Report}$, ceil(M·P·N)·$T_{CSI-RS}$). When $T_{DRX}$≤320 ms, the SINR measurement period is max($T_{Report}$, ceil(1.5·M·P·N)·max($T_{DRX}$, $T_{CSI-RS}$)). When $T_{DRX}$>320 ms, the SINR measurement period is ceil(M·P·N)·$T_{DRX}$.

As an example, assume that in FR2, $T_{DRX}$=160 ms, $T_{Report}$=20 ms, $T_{CSI-RS}$=20 ms, M=1, P=2 (using the example in FIG. 4) and N=1, the SINR measurement period=480 ms. Thus, a least, UE may perform one L1-SINR measurement every 480 ms.

Figure 5:
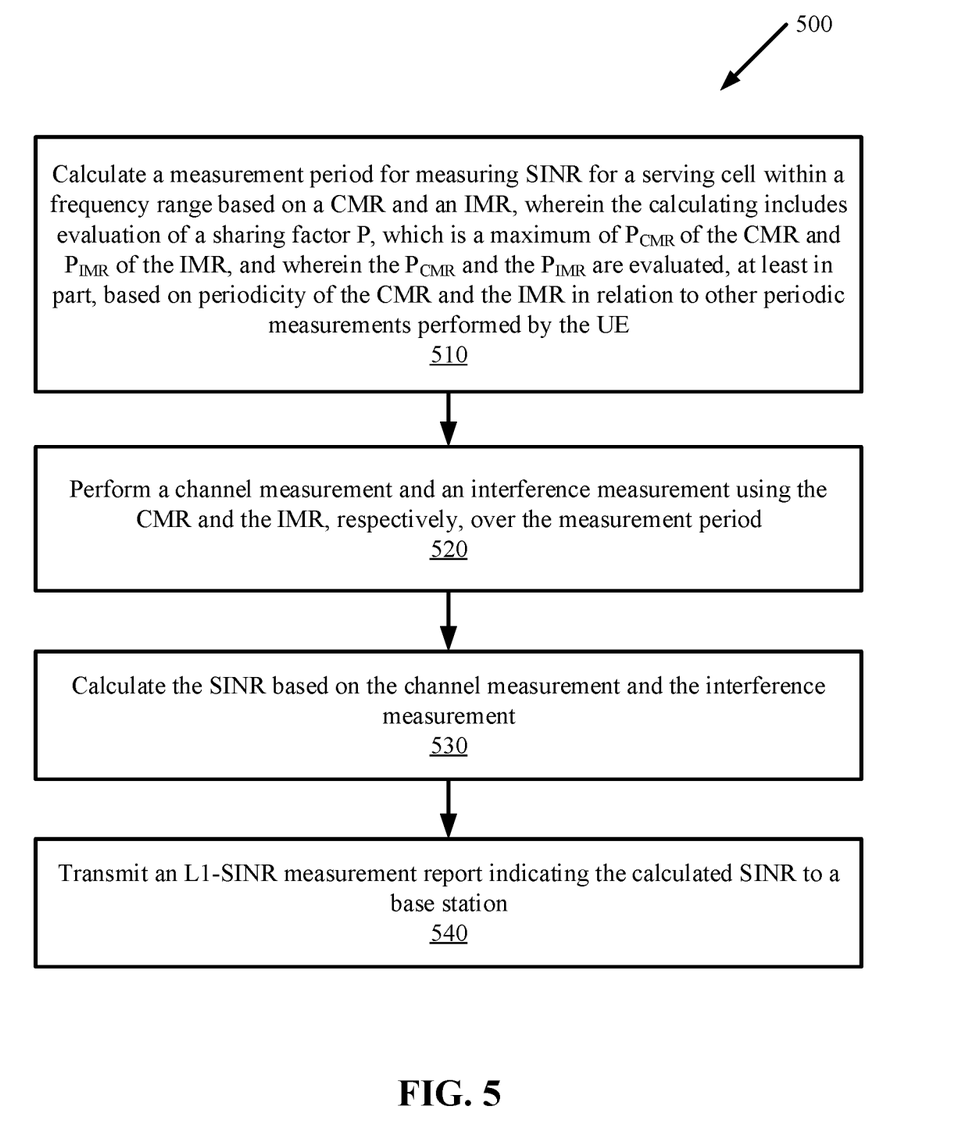
FIG. 5 is a flow diagram illustrating a method performed by a UE for SINR measurements according to one embodiment.

FIG. 5 is a flow diagram illustrating a method 500 performed by a UE in a wireless network according to one embodiment. The method 500 may be performed by the UE of FIG. 6. The method 500 begins at step 510 when the UE calculates a measurement period for measuring SINR for a serving cell within a frequency range based on a CMR and an IMR. The calculating includes evaluation of a sharing factor P, which is a maximum of $P_{CMR}$ of the CMR and $P_{IMR}$ of the IMR. $P_{CMR}$ and $P_{IMR}$ are evaluated, at least in part, based on the periodicity of the CMR and the IMR in relation to other periodic measurements performed by the UE. The UE at step 520 performs a channel measurement and an interference measurement using the CMR and the IMR, respectively, over the measurement period. The UE at step 530 calculates the SINR based on the channel measurement and the interference measurement, and at step 540 transmits an L1-SINR measurement report indicating the calculated SINR to a base station.

Figure 6:
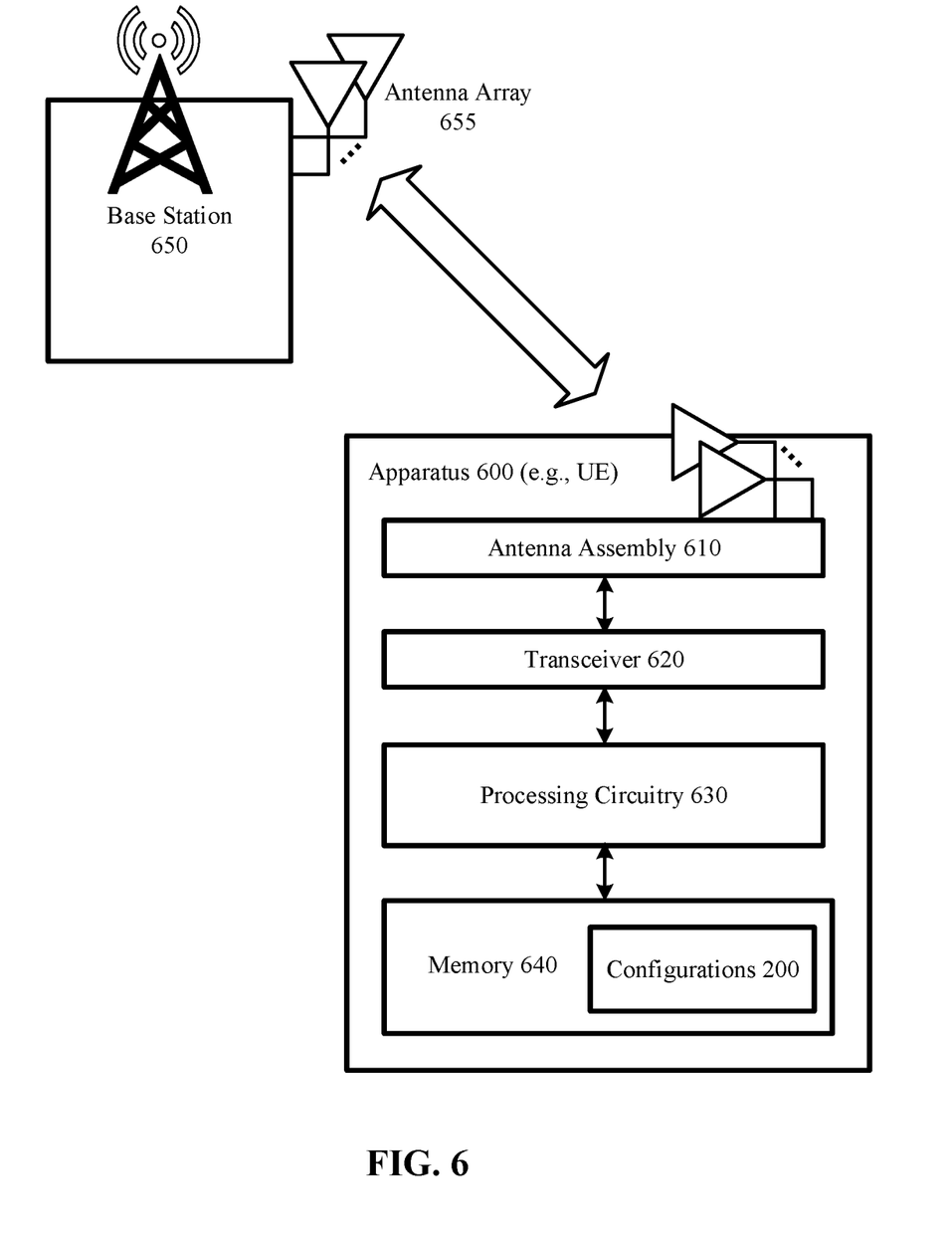
FIG. 6 is a block diagram illustrating an apparatus that performs wireless communication according to one embodiment.

FIG. 6 is a block diagram illustrating elements of an apparatus 600 performing wireless communication with a base station 650 according to one embodiment. In one embodiment, the apparatus 600 may be a UE and the base station 650 may be a gNb or the like, both of which may operate in a wireless network, such as the wireless network 100 in FIG. 1. In one embodiment, the apparatus 600 may be the UE 150 in FIG. 1 and FIG. 2. In one embodiment, the base station 650 includes an antenna array 655 to form beams for transmitting and receiving signals.

As shown, the apparatus 600 may include an antenna assembly 610; e.g., MIMO antenna arrays, to support beamforming operations, and a transceiver circuit (also referred to as a transceiver 620) including a transmitter and a receiver configured to provide radio communications with another station in a radio access network. The transmitter and the receiver may include filters in the digital front end for each cluster, and each filter can be enabled to pass signals and disabled to block signals. The transceiver 620 is operative to transmit an SINR measurement report indicating calculated SINR to a base station.

The apparatus 600 may also include processing circuitry 630 which may include one or more control processors, signal processors, central processing units, cores, and/or processor cores. The processing circuitry 630 may be operative to calculate the SINR measurement period and calculates the SINR according to the method 500 in FIG. 5. The apparatus 600 may also include a memory circuit (also referred to as memory 640) coupled to the processing circuitry 630. The memory 640 may store configurations 200 (FIG. 2) for supporting wireless communication. The processing circuitry 630 is coupled to the memory 640. The apparatus 600 may also include an interface (such as a user interface). The apparatus 600 may be incorporated into a wireless system, a station, a terminal, a device, an appliance, a machine, and IoT operable to perform wireless communication in a multi-access network, such as a 5G NR network. It is understood the embodiment of FIG. 6 is simplified for illustration purposes. Additional hardware components may be included.

In one embodiment, the apparatus 600 may store and transmit (internally and/or with other electronic devices over a network) code (composed of software instructions) and data using computer-readable media, such as non-transitory tangible computer-readable media (e.g., computer-readable storage media such as magnetic disks; optical disks; read-only memory; flash memory devices) and transitory computer-readable transmission media (e.g., electrical, optical, acoustical or other forms of propagated signals). For example, the memory 640 may include a non-transitory computer-readable storage medium that stores computer-readable program code. The code, when executed by the processors, causes the processors to perform operations according to embodiments disclosed herein, such as the method 500 disclosed in FIG. 5.

Although the apparatus 600 is used in this disclosure as an example, it is understood that the methodology described herein is applicable to any computing and/or communication device capable of performing wireless communications.

The operations of the flow diagram of FIG. 5 have been described with reference to the exemplary embodiments of FIGS. 1, 2, and 6. However, it should be understood that the operations of the flow diagram of FIG. 5 can be performed by embodiments of the invention other than the embodiments of FIGS. 1, 2, and 6, and the embodiments of FIGS. 1, 2, and 6 can perform operations different than those discussed with reference to the flow diagram. While the flow diagram of FIG. 5 shows a particular order of operations performed by certain embodiments of the invention, it should be understood that such order is exemplary (e.g., alternative embodiments may perform the operations in a different order, combine certain operations, overlap certain operations, etc.).

Various functional components or blocks have been described herein. As will be appreciated by persons skilled in the art, the functional blocks will preferably be implemented through circuits (either dedicated circuits, or general-purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method performed by a user equipment (UE) in a wireless network, comprising:
   calculating a measurement period for measuring signal-to-interference-plus-noise-ratio (SINR) for a serving cell within a frequency range based on a channel measurement resource (CMR) and an interference measurement resource (IMR), wherein the calculating includes evaluation of a sharing factor P, which is a maximum of $P_{CMR}$ of the CMR and $P_{IMR}$ of the IMR, and wherein the $P_{CMR}$ and the $P_{IMR}$ are evaluated, at least in part, based on periodicity of the CMR and the IMR in relation to other periodic measurements performed by the UE;
   performing a channel measurement and an interference measurement using the CMR and the IMR, respectively, over the measurement period;
   calculating the SINR based on the channel measurement and the interference measurement; and
   transmitting an SINR measurement report indicating the calculated SINR to a base station.

2. The method of claim 1, wherein the $P_{CMR}$ and the $P_{IMR}$ are evaluated independently of each other.

3. The method of claim 1, wherein the sharing factor P extends the measurement period during which the UE measures the CMR and the IMR that are not overlapping with a synchronous signal block (SSB) measurement timing configuration (SMTC) window and are not overlapping with a measurement gap.

4. The method of claim 1, wherein the CMR is a synchronous signal block (SSB) resource or a non-zero-power (NZP) CSI-RS resource.

5. The method of claim 1, wherein the IMR is a non-zero-power (NZP) CSI-RS resource or a zero-power (ZP) channel state information interference measurement (CSI-IM) resource.

6. The method of claim 1, wherein the calculating further includes evaluation of a beamforming scaling factor N based on configurations of the CMR and not based on configurations of the IMR.

7. The method of claim 6, wherein the evaluation of the beamforming scaling factor N for an NZP CSI-RS configured as the CMR is based on whether the NZP CSI-RS is periodic, semi-persistent, or aperiodic, whether a repetition parameter is set to ON or OFF, and whether quasi-collocation (QCL) information of the NZP CSI-RS is configured.

8. The method of claim 6, wherein N=1 for a periodic or semi-persistent NZP CSI-RS configured as the CMR with repetition OFF and the QCL information is configured for all CMRs in a CMR set configured for the UE.

9. The method of claim 6, wherein N=ceil(maxNumberRxBeam/Nres_per_set) for a periodic or semi-persistent NZP CSI-RS configured as the CMR with repetition ON and the QCL information is configured for all CMRs in a CMR set configured for the UE, where maxNumberRxBeam is the maximum number of receive beams of the UE and Nres_per_set is the number of CMRs in the CMR set.

10. The method of claim 1, wherein N=8 for an SSB configured as the CMR.

11. An apparatus for wireless communication, the apparatus being a user equipment (UE) in a wireless network, comprising:
    a memory to store configurations of at least a channel measurement resource (CMR) and an interference measurement resource (IMR);

transceiver circuitry operative to transmit a signal-to-interference-plus-noise-ratio (SINR) measurement report indicating calculated SINR to a base station; and
processing circuitry coupled to the memory and operative to:
calculate a measurement period for measuring SINR for a serving cell within a frequency range based on the CMR and the IMR, wherein the calculating includes evaluation of a sharing factor P, which is a maximum of $P_{CMR}$ of the CMR and $P_{IMR}$ of the IMR, and wherein the $P_{CMR}$ and the $P_{IMR}$ are evaluated, at least in part, based on periodicity of the CMR and the IMR in relation to other periodic measurements performed by the UE;
perform a channel measurement and an interference measurement using the CMR and the IMR, respectively, over the measurement period; and
calculate the SINR based on the channel measurement and the interference measurement.

12. The apparatus of claim 11, wherein the $P_{CMR}$ and the $P_{IMR}$ are evaluated independently of each other.

13. The apparatus of claim 11, wherein the sharing factor P extends the measurement period during which the UE measures the CMR and the IMR that are not overlapping with a synchronous signal block (SSB) measurement timing configuration (SMTC) window and are not overlapping with a measurement gap.

14. The apparatus of claim 11, wherein the CMR is a synchronous signal block (SSB) resource or a non-zero-power (NZP) CSI-RS resource.

15. The apparatus of claim 11, wherein the IMR is a non-zero-power (NZP) CSI-RS resource or a zero-power (ZP) channel state information interference measurement (CSI-IM) resource.

16. The apparatus of claim 11, wherein calculation of the measurement period further includes evaluation of a beamforming scaling factor N based on configurations of the CMR and not based on configurations of the IMR.

17. The apparatus of claim 16, wherein the evaluation of the beamforming scaling factor N for an NZP CSI-RS configured as the CMR is based on whether the NZP CSI-RS is periodic, semi-persistent, or aperiodic, whether a repetition parameter is set to ON or OFF, and whether quasi-collocation (QCL) information of the NZP CSI-RS is configured.

18. The apparatus of claim 16, wherein N=1 for a periodic or semi-persistent NZP CSI-RS configured as the CMR with repetition OFF and the QCL information is configured for all CMRs in a CMR set configured for the UE.

19. The apparatus of claim 16, wherein N=ceil(maxNumberRxBeam/Nres_per_set) for a periodic or semi-persistent NZP CSI-RS configured as the CMR with repetition ON and the QCL information is configured for all CMRs in a CMR set configured for the UE, where maxNumberRxBeam is the maximum number of receive beams of the UE and Nres_per_set is the number of CMRs in the CMR set.

20. The apparatus of claim 11, wherein N=8 for an SSB configured as the CMR.

* * * * *